United States Patent Office 3,080,351
Patented Mar. 5, 1963

3,080,351
POLYMERIZATION OF ORGANIC COMPOUNDS
WITH PHOSPHONIUM CATALYSTS
Wilhelm H. Querfurth, Oberursel, Taunus, Germany, assignor to Deutsche Gold- und Silber-Scheideanstalt vormals Roessler, Frankfurt am Main, Germany
No Drawing. Filed July 14, 1958, Ser. No. 748,169
5 Claims. (Cl. 260—89.5)

The present invention relates to an improved process for the catalytic polymerization of polymerizable organic compounds containing end or mid positioned unsaturated double bonds between two carbon atoms.

It is already known that such unsaturated double bond containing organic compounds can be polymerized by catalysis with oxygen, preferably in peroxidic form, and with organic sulfur compounds, such as sulfinic acids or their salts, alpha-sulfones, sulfoxylates, alpha-amino sulfones or mercaptans. Organic quaternary ammonium compounds have been suggested as polymerization accelerators for such polymerization.

According to the invention it has now been found that organic phosphonium compounds are excellent components of redox systems acting as a catalyst for such polymerization. Therefore, according to the invention, polymerization of polymerizable organic compounds containing end or mid positioned unsaturated double bonds between two carbon atoms such as methacrylic acid methyl ester, acrylic acid, methacrylic acid, acrylonitrile, styrene, vinyl acetate and the like is effected in the presence of a catalytically acting redox system containing an organic phosphonium compound as a component of such system. Organic phosphonium salts having the following structural formula

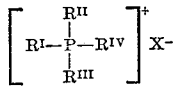

wherein $R^I$, $R^{II}$, $R^{III}$, and $R^{IV}$ represent alkyl, aryl and alkaryl groups and X represents chlorine, bromine or an acidic anion have proved particularly effective.

Generally, a usable range for the organic phosphonium compounds ranges from 0.1 to 0.8 g., preferably from 0.2 to 0.4 g. per 100 cc. of the polymerizable organic compound.

The redox systems used in this invention are well known per se. They include an oxidising component such as hydrogen peroxide, preferably benzoyl peroxide, p,p'-dichloro-dibenzoyl peroxide, di-tertiary-butyl-peroxide, cumene-hydroperoxide, etc. and a reducing component such as secondary or tertiary amines, organic sulfur compounds, such as sulfinic acids or their salts, alphasulfons, sulfoxylates, alpha-amino sulfones or mercaptans. Alpha-amino sulfones are preferably used.

The process according to the invention can be employed in emulsion polymerization, solution polymerization or bulk polymerization. The greatest advantages, however, are achieved in bulk polymerizations, such as, for example, bulk polymerization of esters of methacrylic acid. The polymerization takes place even at low temperatures whereby polymers are obtained the surface of which is thoroughly hardened and which do not turn yellow even after long exposure to light.

The aromatic or alkyl aromatic phosphonium compounds, such as, for example, the salts of phenyl phosphonium compounds, have been found particularly suited phosphonium compounds for use according to the invention. However, the best results will be obtained by using phosphonium compounds of the above mentioned formula, where $R^I$, $R^{II}$ and $R^{III}$ represent aryl groups and $R^{IV}$ represents an alkaryl group.

The phosphonium compounds can be employed according to the invention either alone or in combination with other reducing organic compounds as a component of the catalytically active redox system. For example, small quantities of the phosphonium compounds in combination with organic sulfur compounds can be added to the mixture to be polymerized.

It furthermore was found that especially good results are obtained when the phosphonium compounds are employed in combination with amines or amine salts, particularly secondary or tertiary aromatic or alphatic amines and their hydrohalides.

In addition it is also possible to employ known accelerators or co-catalysts, such as heavy metal compounds, compounds containing a labile halogen atom and/or mono or polyhdric alcohols in conjunction with the catalyst system according to the invention.

In order to achieve an even better light stability in the polymerization product it is in some instances advisable to incorporate substances which absorb short waved light together with the phosphonium compounds in the mixtures to be polymerized.

The catalyst systems according to the invention are especially effective in the polymerization of mixtures which contain highly polymeric compounds dispersed in liquid polymerizable monomeric compounds, such as, for example, pastes prepared from monomeric methacrylic acid methyl ester and powdered polymerized methacrylic acid methyl ester, polystyrene etc.

The process according to the invention can be used in various technical applications, such as, for example, the production of self-hardening lacquers, coatings, spachteling masses or adhesives. The process according to the invention is of special significance for dental applications.

The following example illustrates several preferred embodiments of the invention:

EXAMPLE 1

Several polymerizations were carried out, each employing a mixture of 1 g. of powder and 0.6 cc. of liquid. The powder consisted of 100 parts by weight of powdered polymerized methacrylic acid methyl ester containing 1.5 parts by weight of benzoyl peroxide, 1.5 parts by weight of $(CH_3C_6H_4SO_2CH_2)_2NCH_3$ and 0.1 part by weight of $TiO_2$. The liquid consisted of monomeric methacrylic acid methyl ester containing 0.006 g. of hydroquinone, 2 g. of methyl alcohol and .006 g. of copper as copper naphthenate per 100 cc. of such monomer and the various catalyst accelerators in the quantities indicated in the following table. The table also gives the time required for the polymerization, as well as the maximum polymerization temperature reached in each instance.

Table

| Accelerator Composition | Duration of polymerization in min. | Max. Polym. Temp., °C. |
| --- | --- | --- |
| 0.4 g. [(C₆H₅)₃PCH₂C₆H₅]Cl | 7¼ | 42 |
| 0.4 g. [(C₆H₅)₃PCH₂COOC₂H₅]Cl | 8½ | 39 |
| 0.4 g. [(C₆H₅)₃PCH₂CH₂C₆H₅]Br | 8½ | 29 |
| 0.2 g. [(C₆H₅)₃PCH₂C₆H₅]Cl+0.2 g. C₆H₅CH₂CH₂N(C₄H₉)₂.HCl | 8¼ | 40 |
| 0.2 g. [(C₆H₅)₃PCH₂COOC₂H₅]Cl+0.2 g. C₆H₅CH₂CH₂N(C₄H₉)₂.HCl | 8¼ | 20 |
| 0.2 g. [(C₆H₅)₃PCH₂CH₂C₆H₅]Br+0.2 g. C₆H₅CH₂CH₂N(C₄H₉)₂.HCl | 8 | 38 |

EXAMPLE 2

Example 1 was repeated except that the peroxide was cumene-hydroperoxide and 0.4 g. [(C₆H₅)₃PCH₂C₆H₅]Cl were used as accelerator. The duration of polymerization was 7½ min. and the maximum polymerization temperature was 41° C.

EXAMPLE 3

Example 2 was repeated except that the polymerizable organic compound was acrylonitrile and the accelerator composition consisted of 0.6 g. [(C₆H₅)₃PCH₂C₆H₅]Cl and 0.2 g. C₆H₅CH₂·CH₂N(C₄H₉)₂·HCl.
Duration of polymerization: 4¼ min.
Maximum polymerization temperature: 65° C.

EXAMPLE 4

Example 2 was repeated except that the polymerizable organic compound was acrylic acid and the peroxide was p,p'-dichloro-dibenzoyl-peroxide.
Duration of polymerization: 2½ min.
Maximum polymerization temperature: 62° C.

EXAMPLE 5

Example 2 was repeated except that the polymerizable organic compound was methyl acrylate, the polymeric compound was polystyrene and the peroxide was p,p'-dichloro-dibenzoyl-peroxide.
Duration of polymerization: 6 min.
Maximum polymerization temperature: 51° C.

EXAMPLE 6

Example 2 was repeated except that no alcohol was used and the polymerizable organic compound was acrylonitrile.
Duration of polymerization: 5 min.
Maximum polymerization temperature: 28° C.

EXAMPLE 7

Example 2 was repeated except that acrylic acid was used as polymerizable organic compound and the peroxide was di-tertiary-butyl-peroxide.
Duration of polymerization: 12 min.
Maximum polymerization temperature: 31° C.

EXAMPLE 8

Example 2 was repeated except that 0.2 g. beta-phenyl-ethyl-dibutylamin and 0.2 g. [(C₆H₅)₃PCH₂C₆H₅]Cl were used as accelerator composition and that acrylonitrile was the polymerizable compound.
Duration of polymerization: 9¼ min.
Maximum polymerization temperature: 39° C.

EXAMPLE 9

Example 8 was repeated except that acrylonitrile was the polymerizable organic compound.
Duration of polymerization: 5 min.
Maximum polymerization temperature: 65° C.

EXAMPLE 10

Example 2 was repeated except that tri-phenyl-phosphonium-aceton was used as accelerator in the absence of an amine and that chloro-benzoyl-peroxide was used as catalyst.
Duration of polymerization: 10¼ min.
Maximum polymerization temperature: 40° C.

Other phosphonium compounds which can be used with the same success in the foregoing examples are f.i.: triphenyl-cetyl-phosphonium-bromide, triphenyl-dodecyl-phosphonium - bromide, triphenyl - cyclohexyl - phosphonium-bromide, triphenyl-ethyl-phosphonium-bromide etc.

I claim:

1. In a process for the catalytic polymerization of a polymerizable mass comprising a liquid polymerizable compound containing a single terminal >C=CH₂ group in the presence of a catalytic amount of a redox system containing at least one peroxide compound as an oxidizing component and at least one reducing component selected from the group consisting of secondary amines, tertiary amines and their salts, the step which comprises incorporating an organic phosphonium compound of the formula

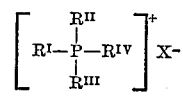

wherein $R^I$, $R^{II}$, $R^{III}$ and $R^{IV}$ are selected from the group consisting of alkyl, aryl and alkaryl and X is selected from the group consisting of chlorine, bromine and acidic anions as a component of said redox system.

2. The process of claim 1 in which said polymerization is a bulk polymerization.

3. The process of claim 1 in which the polymerizable organic compound is polymerized in admixture with a polymeric compound obtained by polymerization of a liquid compound containing a single terminal >C=CH₂ group.

4. In a process for the catalytic bulk polymerization of a polymerizable mass containing an admixture of monomeric methacrylic acid methyl ester with powdered polymeric methacrylic acid methyl ester in the presence of a catalytic amount of a redox system containing at least one peroxide compound as an oxidizing component and at least one reducing component selected from the group consisting of secondary amines, tertiary amines and their salts, the step which comprises incorporating an organic phosphonium compound of the formula

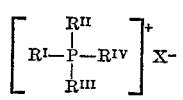

wherein $R^I$, $R^{II}$, $R^{III}$ and $R^{IV}$ are selected from the group consisting of alkyl, aryl and alkaryl and X is selected from the group consisting of chlorine, bromine and acidic anions as a component of said redox system.

5. The process of claim 1 in which said organic phosphonium compound contains three aryl groups and one alkaryl group.

References Cited in the file of this patent

UNITED STATES PATENTS

| | | |
|---|---|---|
| 2,520,601 | Lee | Aug. 29, 1950 |
| 2,543,635 | Loritsch | Feb. 27, 1951 |
| 2,675,372 | Coover | Apr. 13, 1954 |
| 2,740,765 | Parker | Apr. 3, 1956 |
| 2,870,118 | Bader et al. | Jan. 20, 1959 |

FOREIGN PATENTS

| | | |
|---|---|---|
| 167,749 | Australia | Mar. 25, 1956 |
| 759,535 | Great Britain | Oct. 17, 1956 |
| 792,812 | Great Britain | Apr. 2, 1958 |